United States Patent
Kwon et al.

(10) Patent No.: US 12,505,010 B2
(45) Date of Patent: Dec. 23, 2025

(54) METHOD OF TRANSMITTING AND RECEIVING IMAGE SIGNALS AND IMAGE PROCESSING DEVICE FOR IMPLEMENTING THE SAME

(71) Applicant: LX SEMICON CO., LTD., Daejeon (KR)

(72) Inventors: You Jin Kwon, Daejeon (KR); A Reum Kim, Daejeon (KR); Jae Eun Lee, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 18/425,637

(22) Filed: Jan. 29, 2024

(65) Prior Publication Data

US 2024/0256381 A1 Aug. 1, 2024

(30) Foreign Application Priority Data

Jan. 30, 2023 (KR) .......... 10-2023-0011394
Sep. 22, 2023 (KR) .......... 10-2023-0127041

(51) Int. Cl.
*G06F 11/10* (2006.01)
*G06F 11/32* (2006.01)

(52) U.S. Cl.
CPC ........ *G06F 11/1012* (2013.01); *G06F 11/327* (2013.01)

(58) Field of Classification Search
None
See application file for complete search history.

(56) References Cited

U.S. PATENT DOCUMENTS

| 8,793,723 B2* | 7/2014 | Altmann | H04N 7/167 380/255 |
| 10,805,648 B2* | 10/2020 | Inata | G09G 5/006 |
| 2002/0018054 A1* | 2/2002 | Tojima | G09G 5/393 345/204 |

(Continued)

FOREIGN PATENT DOCUMENTS

KR 10-0516052 B1 12/2005

OTHER PUBLICATIONS

Hyun-Kyu Jeon et al., "High speed serial interface for mobile LCD driver IC," 2008 IEEE International Symposium on Circuits and Systems (ISCAS), Seattle, WA, USA, 2008, pp. 157-160, (Year: 2008).*

(Continued)

*Primary Examiner* — Daniel F. McMahon
(74) *Attorney, Agent, or Firm* — ROTHWELL, FIGG, ERNST & MANBECK, P.C.

(57) ABSTRACT

Disclosed are a method of transmitting and receiving image signals and an image processing device for implementing the same, by which an error detection code for verification of image related data can be provided in transmitting the image related data to a receiving side from a transmitting side. The disclosure includes generating a control field frame including Average Picture Level (APL) data of image data and an error detection code for the APL data, transmitting the generated control field frame in a vertical blanking period according to a serial interface system, and transmitting pixel data of the image data in a vertical non-blanking period according to the serial interface system.

20 Claims, 10 Drawing Sheets

(56) References Cited

U.S. PATENT DOCUMENTS

| | | | |
|---|---|---|---|
| 2009/0135304 A1* | 5/2009 | Inoue | G09G 5/006 |
| | | | 348/712 |
| 2015/0326884 A1* | 11/2015 | Bae | H04N 19/182 |
| | | | 375/240.27 |
| 2018/0144693 A1* | 5/2018 | Saito | H04N 21/4333 |
| 2020/0050520 A1* | 2/2020 | Ogawa | G06F 11/0721 |

OTHER PUBLICATIONS

HDMI Licensing Administrator, Inc., "High-Definition Multimedia Interface, Specification Version 1.4," Jun. 5, 2009, 425 pages, retrieved from <<URL:http://wenku.baidu.com/view/e7db77d184254b35eefd34d0.html>> on Jun. 16, 2010.

Extended European Search Report dated Jun. 6, 2024, issued for the corresponding European patent application No. 24152691.2, 10 pages.

* cited by examiner

FIG. 6

|  | Preamble | Length/Type | Data | Padding | Error detection code |
|---|---|---|---|---|---|
| pixclk | 1 | 1 | 1~7 |  | 1 |
| 4-byte mode | 2B | 2B | 2B ~ 14B |  | 2B |
| 5-byte mode | 3B | 3B | 3B ~ 21B |  | 3B |

| Vx1 Timing | frame symbol | horizontal blank | | N-th | | | vertical blank | | | | | | | | | | 1-th | H-blank |
|---|---|---|---|---|---|---|---|---|---|---|---|---|---|---|---|---|---|---|
| | | FSBP | FSBE | FSACTIVE | | FSBS | FSBP | FSBP | FSBP | FSBP | FSBP | ... | FSBP | FSBE_SR | FSACTIVE | | FSBS |
| | BYTE0 | 0xFF | SYNH | | | SYNH | 0x00 | 0x00 | 0x00 | 0x00 | 0x00 | ... | 0x00 | SYNH | | | SYNH |
| | BYTE1 | 0xFF | SYNH | pixel data | | SYNH | 0xFF | 0xFF | 0x00 | 0x00 | 0x00 | ... | 0xFF | SYNH | pixel data | | SYNH |
| | BYTE2 | CTL | BE | | | BS | CTL | CTL | CTL | CTL | CTL | ... | CTL | BE_SR | | | BS |
| | BYTE3 | CTL | BE | | | BS | CTL | CTL | CTL | CTL | CTL | ... | CTL | BE_SR | | | BS |
| | BYTE4 | CTL | BE | | | BS | CTL | CTL | CTL | CTL | CTL | ... | CTL | BE_SR | | | BS |

| bit-map | packet name | | | | | | | | Vx1 CTL Packet for APL | | | | | | | |
|---|---|---|---|---|---|---|---|---|---|---|---|---|---|---|---|---|
| | | FSBP | FSBP | | | | | | vertical blank (available for CTL Field Frame) | | | | | | | FSBP |
| | | | | | | | | | Preamble | Len/Type | Data | padding | FCS | | | |
| | BYTE0 | 0xFF | 0x00 | CTL | ... | CTL | CTL | CTL | 0x00 | 0x00 | 0x00 | 0 | 0x00 | CTL | ... | CTL | 0x00 |
| | BYTE1 | 0x00 | 0x00 | CTL | ... | CTL | CTL | CTL | 0x00 | 0x00 | 0x00 | 0 | 0x00 | CTL | ... | CTL | 0x00 |
| CTL[0] | BYTE2 | CTL | CTL | CTL | CTL | CTL | CTL | CTL | 0xA5 | 2 | 0 | 0 | FCS bit | CTL | CTL | CTL | CTL |
| CTL[1] | | CTL | CTL | CTL | CTL | CTL | CTL | CTL | | 0 | 0 | 0 | FCS bit | CTL | CTL | CTL | CTL |
| CTL[2] | | CTL | CTL | CTL | CTL | CTL | CTL | CTL | | 0 | 0 | 0 | FCS bit | CTL | CTL | CTL | CTL |
| CTL[3] | | CTL | CTL | CTL | CTL | CTL | CTL | CTL | | 0 | 0 | 0 | FCS bit | CTL | CTL | CTL | CTL |
| CTL[4] | | CTL | CTL | CTL | CTL | CTL | CTL | CTL | | 0 | 0 | 0 | FCS bit | CTL | CTL | CTL | CTL |
| CTL[5] | | CTL | CTL | CTL | CTL | CTL | CTL | CTL | | 0 | APL[0] | 0 | FCS bit | CTL | CTL | CTL | CTL |
| CTL[6] | | CTL | CTL | CTL | CTL | CTL | CTL | CTL | | 0 | APL[1] | 0 | FCS bit | CTL | CTL | CTL | CTL |
| CTL[7] | | CTL | CTL | CTL | CTL | CTL | CTL | CTL | | 0 | APL[2] | 0 | FCS bit | CTL | CTL | CTL | CTL |
| CTL[8] | BYTE3 | CTL | CTL | CTL | CTL | CTL | CTL | CTL | 0x5A | 0 | APL[3] | 0 | FCS bit | CTL | CTL | CTL | CTL |
| CTL[9] | | CTL | CTL | CTL | CTL | CTL | CTL | CTL | | 1 | APL[4] | 0 | FCS bit | CTL | CTL | CTL | CTL |
| CTL[10] | | CTL | CTL | CTL | CTL | CTL | CTL | CTL | | 0 | APL[5] | 0 | FCS bit | CTL | CTL | CTL | CTL |
| CTL[11] | | CTL | CTL | CTL | CTL | CTL | CTL | CTL | | 0 | APL[6] | 0 | FCS bit | CTL | CTL | CTL | CTL |
| CTL[12] | | CTL | CTL | CTL | CTL | CTL | CTL | CTL | | 0 | APL[7] | 0 | FCS bit | CTL | CTL | CTL | CTL |
| CTL[13] | | CTL | CTL | CTL | CTL | CTL | CTL | CTL | | 0 | APL[8] | 0 | FCS bit | CTL | CTL | CTL | CTL |
| CTL[14] | | CTL | CTL | CTL | CTL | CTL | CTL | CTL | | 0 | APL[9] | 0 | FCS bit | CTL | CTL | CTL | CTL |
| CTL[15] | | CTL | CTL | CTL | CTL | CTL | CTL | CTL | | 0 | 0 | 0 | FCS bit | CTL | CTL | CTL | CTL |
| CTL[16] | BYTE4 (when 5byte mode) | CTL | CTL | CTL | CTL | CTL | CTL | CTL | 0xAA | 0xAA | 0 | 0 | FCS bit | CTL | CTL | CTL | CTL |
| CTL[17] | | CTL | CTL | CTL | CTL | CTL | CTL | CTL | | | 0 | 0 | FCS bit | CTL | CTL | CTL | CTL |
| CTL[18] | | CTL | CTL | CTL | CTL | CTL | CTL | CTL | | | 0 | 0 | FCS bit | CTL | CTL | CTL | CTL |
| CTL[19] | | CTL | CTL | CTL | CTL | CTL | CTL | CTL | | | 0 | 0 | FCS bit | CTL | CTL | CTL | CTL |
| CTL[20] | | CTL | CTL | CTL | CTL | CTL | CTL | CTL | | | 0 | 0 | FCS bit | CTL | CTL | CTL | CTL |
| CTL[21] | | CTL | CTL | CTL | CTL | CTL | CTL | CTL | | | 0 | 0 | FCS bit | CTL | CTL | CTL | CTL |
| CTL[22] | | CTL | CTL | CTL | CTL | CTL | CTL | CTL | | | 0 | 0 | FCS bit | CTL | CTL | CTL | CTL |
| CTL[23] | | CTL | CTL | CTL | CTL | CTL | CTL | CTL | | | 0 | 0 | FCS bit | CTL | CTL | CTL | CTL |

METHOD OF TRANSMITTING AND RECEIVING IMAGE SIGNALS AND IMAGE PROCESSING DEVICE FOR IMPLEMENTING THE SAME

Pursuant to 35 U.S.C. § 119(a), this application claims the benefit of earlier filing date and right of priority to Korean Application No. 10-2023-0011394 filed on Jan. 30, 2023 and 10-2023-0127041 filed on Sep. 22, 2023, the contents of which are hereby incorporated by reference herein in their entirety.

BACKGROUND OF THE DISCLOSURE

Technical Field

The present disclosure relates to a method of transmitting and receiving image signals according to a serial interface system of serially transmitting a digital image signal between a transmitting side and a receiving side and an image processing device for implementing the same.

Background

An image processing device processes an image signal or data received from the outside according to various image processing processes. The image processing device may display the processed image data as an image on a display panel equipped with its own, or output the image data processed to be displayed as an image on another display device equipped with a panel to the corresponding display device. That is, when an image processing device is a device capable of processing image data, it may pertain to both a case of having a panel capable of displaying an image and a case of failing to have the panel. The former case is specifically referred to as a display device, and examples thereof include a TV, a portable multimedia player, a tablet, a mobile phone, and the like, and examples of the latter case include a set-top box, a video player, and the like.

Image data is transmitted from a transmitting side to a receiving side by an interface of preset specifications. The transmitting side and the receiving side may be respectively devices or boards. An example of transmitting image data between the devices may include a case in which image data is outputted from an image processing device to a display device, and an example of transmitting image data between the boards may include a case of outputting image data from an image processing board to a timing controller board in a device. As resolution of image data increases, the amount of image data to be transmitted per unit clock increases, and various transmission interface specifications have been proposed to meet such demands.

In the related art, when image data is transmitted from a transmitting side to a receiving side through a preset interface, the receiving side receives and processes the image data as it is without a separate verification process. However, a signal that does not conform to the image format standard may be generated in the process of generating a signal for transmission by the transmitting side, or a signal failing to conform to the image format standard may be transmitted to the receiving side due to damage occurring while transmitting the image data from the transmitting side. If such a signal failing to conform to the image format standard is received by the receiving side, as a result, an image may not be displayed normally or it may be difficult to display the image at all.

SUMMARY

Accordingly, to substantially obviate one or more problems due to limitations and disadvantages of the related art, one object of the present disclosure is to provide a method of transmitting and receiving image signals and an image processing device for implementing the same, by which an error detection code for verification of image related data can be provided in transmitting the image related data to a receiving side from a transmitting side.

To achieve these objects and other advantages and in accordance with the purpose of the disclosure, as embodied and broadly described herein, a method of transmitting image data may include generating a control field frame including Average Picture Level (APL) data of image data and an error detection code for the APL data, transmitting the generated control field frame in a vertical blanking period according to a serial interface system, and transmitting pixel data of the image data in a vertical non-blanking period according to the serial interface system.

The control field frame may be transmitted in a low logic period of a vertical synchronization signal within the vertical blanking period.

The control field frame may be transmitted in a low logic period of a horizontal synchronization signal within the low logic period of the vertical synchronization signal.

The control field frame may be transmitted within a low logic period of a data enable signal.

The control field frame may include a data field filled with the APL data and an error detection field filled with the error detection code.

The error detection code may include a Cyclic Redundancy Check (CRC) code.

The serial interface system may follow a V-by-One (Vx1) standard.

In another aspect of the present disclosure, as embodied and broadly described herein, a method of receiving image data may include receiving a control field frame for image data and pixel data of the image data according to a serial interface system, parsing Average Picture Level (APL) data of the image data and an error detection code for the APL data in the control field frame, determining whether an error occurs in the APL Data using the error detection code, displaying the pixel data according to the APL data based on determining that the error fails to occur, and ignoring the APL data based on determining that the error occurs.

The method may further include outputting an alarm for the occurring error.

The method may further include displaying the pixel data according to preset APL data based on determining that the error occurs.

In another aspect of the present disclosure, as embodied and broadly described herein, an image processing device may include a transmitter configured to generate a control field frame including Average Picture Level (APL) data of image data and an error detection code for the APL data, transmit the generated control field frame in a vertical blanking period according to a serial interface system, and transmit pixel data of the image data in a vertical non-blanking period according to the serial interface system and a receiver configured to receive the control field frame and the pixel data according to the serial interface system, parse the APL data and the error detection code, determine whether an error occurs in the APL Data using the error detection code, display the pixel data according to the APL data based on determining that the error fails to occur, and ignore the APL data based on determining that the error occurs.

Accordingly, the present disclosure provides the following effects and/or advantages.

According to at least one of the various aspects of the present disclosure, image related data related to Average Picture Level (APL) data and an error detection code for the APL data can be efficiently transmitted from a transmitting side to a receiving side through a control field frame.

Effects obtainable from the present disclosure may be non-limited by the above-mentioned effects. And, other unmentioned effects can be clearly understood from the following description by those having ordinary skill in the technical field to which the present disclosure pertains.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 6 is a diagram illustrating another structure of a control field frame for transmitting APL data;

FIG. 7 and FIG. 8 are diagrams illustrating examples of the mapping of the control field frame of FIG. 6;

DETAILED DESCRIPTION OF THE DISCLOSURE

Figure 1:
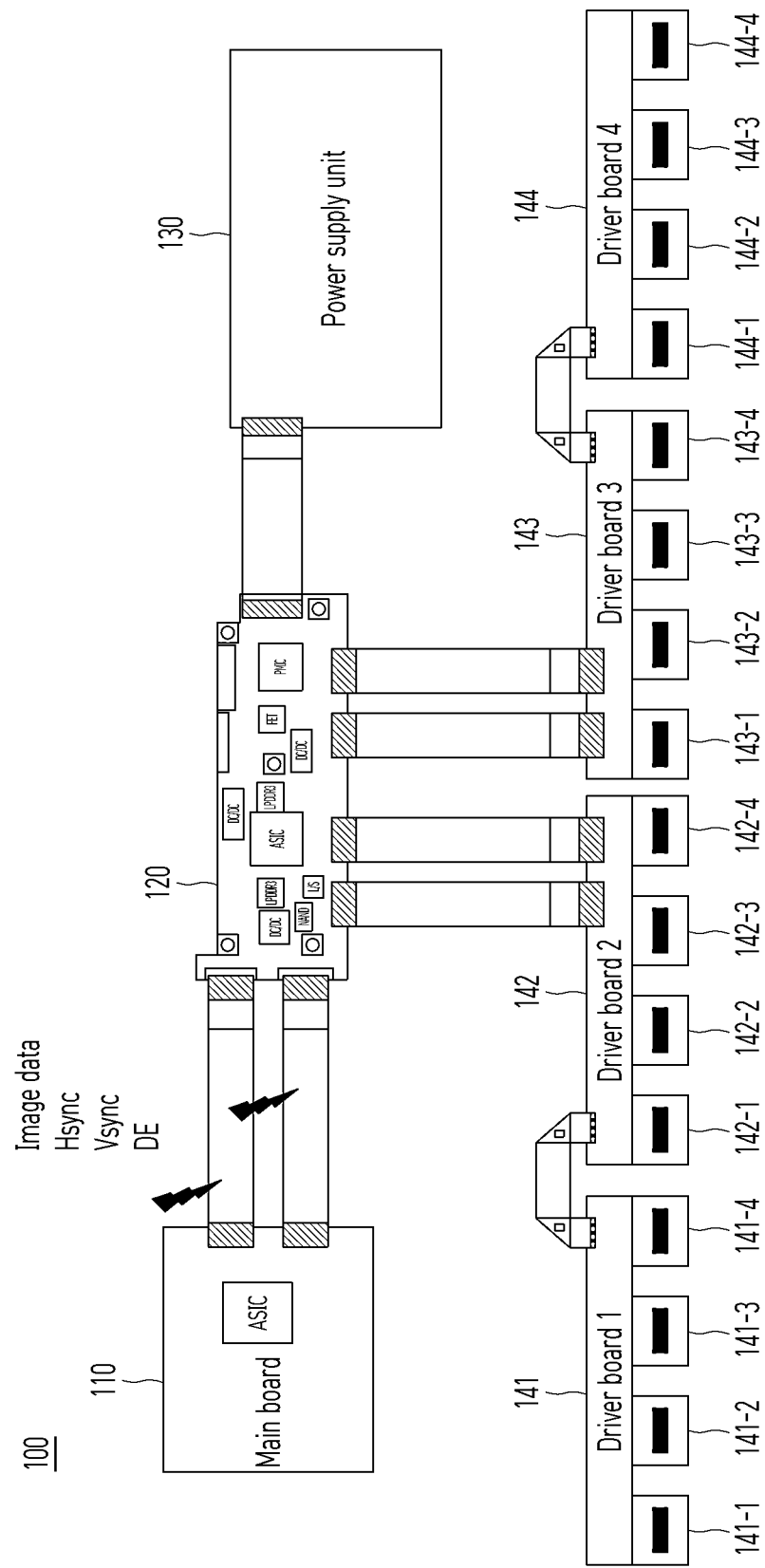
FIG. 1 is a schematic block diagram of an image processing device according to one aspect of the present disclosure.

Throughout the specification, like reference numerals are used to refer to substantially the same components. In the following description, detailed descriptions of components and features known in the art may be omitted if they are not relevant to the core configuration of the present disclosure. The meanings of terms used in this specification are to be understood as follows.

The advantages and features of the present disclosure, and methods of achieving them, will become apparent from the detailed description of the embodiments, together with the accompanying drawings. However, the present disclosure is not limited to the embodiments disclosed herein and will be implemented in many different forms. The embodiments are provided merely to make the disclosure of the present disclosure thorough and to fully inform one of those skilled in the art to which the present disclosure belongs of the scope of the disclosure. It is to be noted that the scope of the present disclosure is defined only by the claims.

The figures, dimensions, ratios, angles, numbers of elements given in the drawings are merely illustrative and are not limiting. Like reference numerals refer to like elements throughout the specification. Further, in describing the present disclosure, descriptions of well-known technologies may be omitted in order to avoid obscuring the gist of the present disclosure.

As used herein, the terms "includes," "has," "comprises," and the like should not be construed as being restricted to the means listed thereafter unless specifically stated otherwise. Where an indefinite or definite article is used when referring to a singular noun e.g. "a" or "an", "the", this includes a plural of that noun unless something else is specifically stated.

Elements are to be interpreted a margin of error, even if not explicitly stated otherwise.

In describing positional relationship, for example, if the positional relationship of two parts is described as 'on ~', 'over ~', 'under ~', 'next to ~', or the like, one or more other parts may be located between the two parts unless 'right' or 'direct' is used.

In describing temporal relationships, terms such as "after," "subsequent to," "next to," "before," and the like may include cases where any two events are not consecutive, unless the term "immediately" or "directly" is explicitly used.

While the terms first, second, and the like are used to describe various elements, the elements are not limited by these terms. These terms are used merely to distinguish one element from another. Accordingly, a first element referred to herein may be a second element within the technical idea of the present disclosure.

"X-axis direction", "Y-axis direction", and "Z-axis direction" should not be interpreted only as a geometrical relationship in which the relationship between each other is vertically formed, and may mean that the configuration of the present disclosure has a wider directionality within the range in which it may work functionally.

Hereinafter, a configuration of an image processing device according to one aspect of the present disclosure will be described with reference to FIG. 1. FIG. 1 is a schematic block diagram of an image processing device according to one aspect of the present disclosure.

An image processing device 100 may include a main board 110, a timing controller board 120, a power supply unit 130, and driver boards 141, 142, 143, and 144.

The main board 110 may process image data input to the image processing device 100 according to various image processing processes, and output the processed image data to the timing controller board 120. The types of the image processing process performed in the main board 110 are non-limited, and for example, may include demultiplexing of dividing an input transmission stream into sub-streams of an image signal, an audio signal, and additional data, decoding of an image signal, scaling of adjusting an image signal to a preset resolution, noise reduction for improving image quality, detail enhancement, frame refresh rate conversion, and the like. In addition to such an image processing process, the main board 110 may perform various processes according to types and characteristics of data.

The timing controller board 120, simply referred to as a T-con board, adjusts the amount of data transmitted to the driver boards 141, 142, 143, and 144, and controls the driver chips constituting the driver boards 141, 142, 143, and 144, respectively. The timing controller board 120 transmits the image data received from the main board 110 to the driver chip of each of the driver boards 141, 142, 143, and 144. The timing controller board 120 controls the driver boards 141, 142, 143, and 144 to adjust the timing of applying the image data for each channel of a display panel (not shown).

The timing controller board 120 generates a control signal for controlling the driver board by receiving not only image data but also various timing signals including a vertical synchronization signal Vsync, a horizontal synchronization signal Hsync, and a Data Enable (DE) signal.

The power supply unit 130 supplies power to the timing controller board 120. Of course, the power supply unit 130 may supply power to other components as needed.

The driver boards 141, 142, 143, and 144 are disposed along the edges of the display panel to implement an image on the display panel by applying driving signals in pixel units to the display panel.

Although FIG. 1 illustrates that the driver boards include four boards 141, 142, 143, and 144, the present disclosure is non-limited thereto. In consideration of the size and/or resolution of the display panel connected to the image processing device, the driver boards may include a single board only or more or less than four boards.

In addition, in FIG. 1, four driver chips 141-1 to 141-4, 142-1 to 142-4, 143-1 to 143-4, or 144-1 to 144-4 are illustrated as provided to each board, but fewer or more driver chips may be provided thereto.

Figure 2:
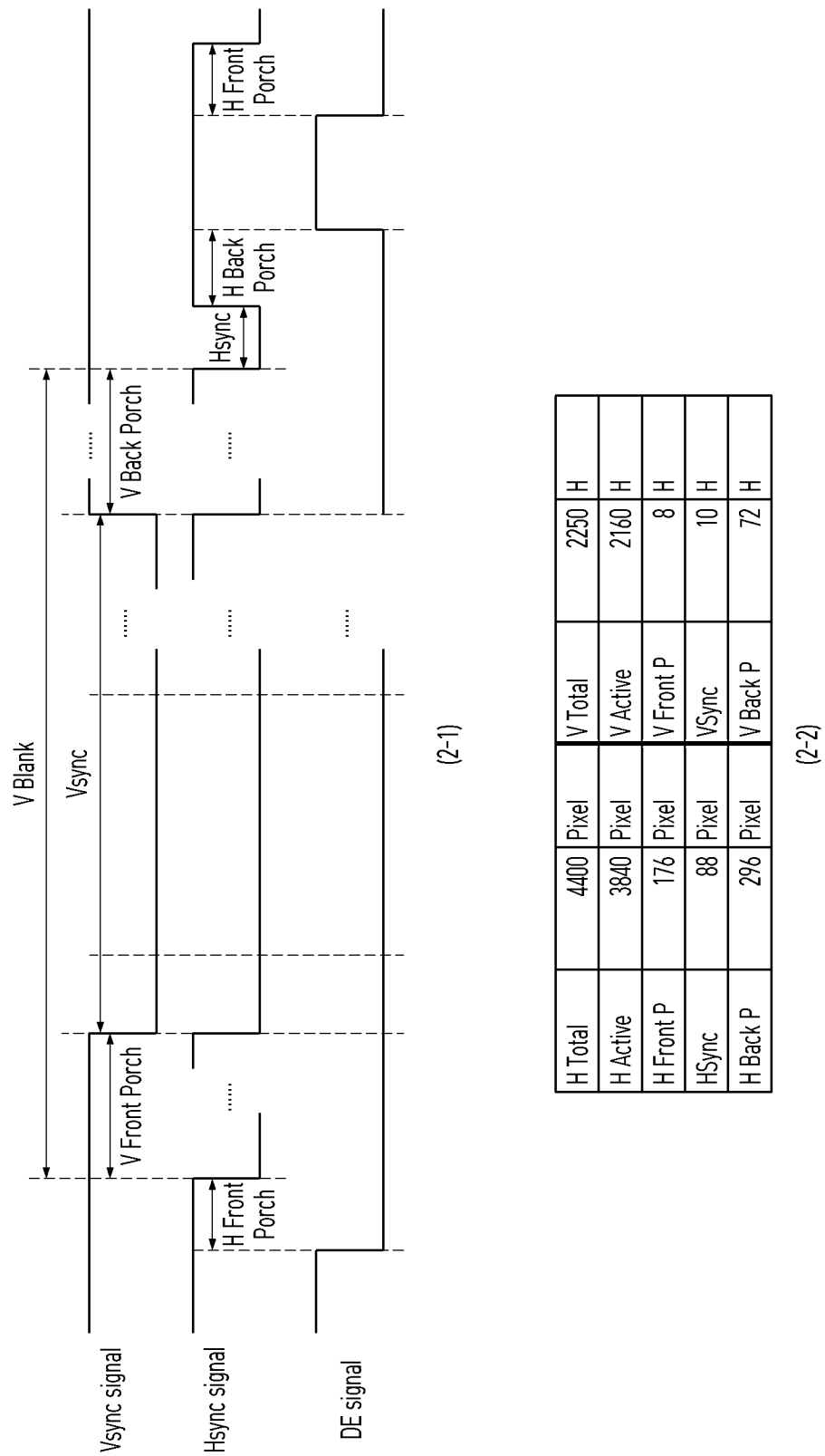
FIG. 2 shows a diagram (2-1) and a table (2-2), illustrating display timing according to Ultra High Definition (UHD) resolution.

Hereinafter, the timing relationship among a vertical synchronization signal (Vsync signal), a horizontal synchronization signal (Hsync signal), and a data enable signal (DE signal) will be described with reference to FIG. 2. FIG. 2 illustrates display timing according to Ultra High Definition (UHD) resolution.

As shown in FIG. 2 (2-1), the vertical synchronization signal (Vsync signal) includes a vertical synchronization period Vsync of a low logic, a vertical front porch period V Front Porch before the vertical synchronization period Vsync, and a vertical back porch period V Back Porch after the vertical synchronization period Vsync. The vertical synchronization period Vsync, the vertical front porch period V Front Porch, and the vertical back porch period V Back Porch are defined as a vertical blanking period Vblank.

The horizontal synchronization signal (Hsync signal) includes a horizontal synchronization period Hsync of the low logic and a horizontal front porch period H Front Porch before and after the horizontal synchronization period Hsync, and a horizontal back porch period H Back Porch after the horizontal synchronization period Hsync. The horizontal synchronization period Hsync, the horizontal front porch period H Front Porch, and the horizontal back porch period V Back Porch may be defined as a horizontal blanking period Hblank.

The data enable signal DE becomes a high logic in a period failing to belong to any one of the vertical blanking period Vblank and the horizontal blanking period Hblank, and becomes a low logic in a period n belonging to any one of the vertical blanking period Vblank and the horizontal blanking period Hblank. The data enable signal (DE signal) is synchronized with the inputted image data so that the image data is displayed in a prescribed active area.

The detailed timing relationship of the above periods in Ultra High Definition (UHD) resolution is summarized in the table of FIG. 2 (2-2).

Figure 3:
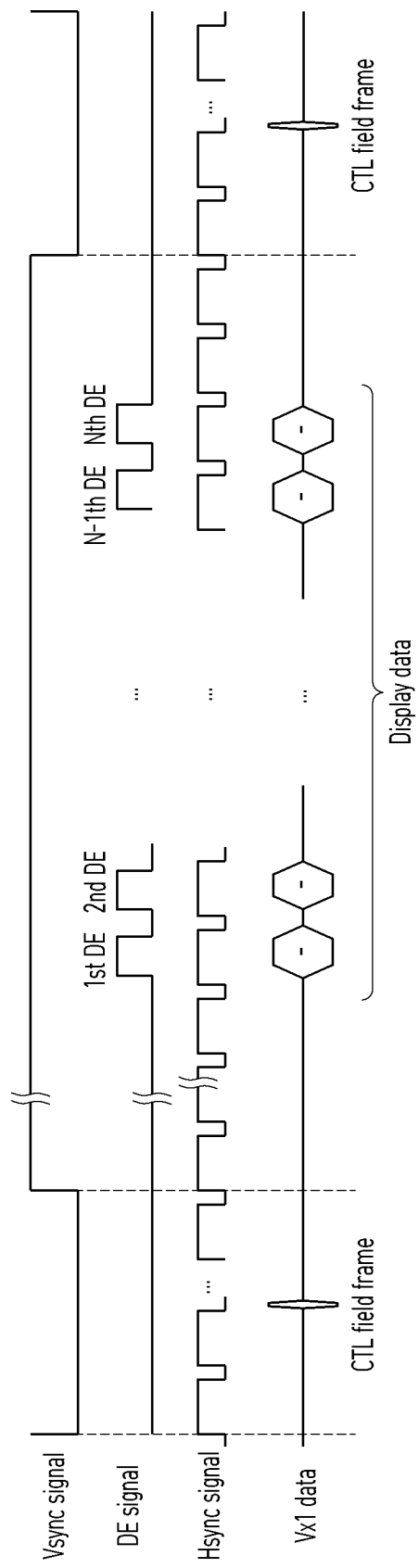
FIG. 3 is a diagram illustrating transmission timing of a control field frame according to a V-by-One (Vx1) specification.

When a transmission interface type m of image data in the image processing device 100 follows the V-by-One (Vx1) standard, a control (CTL) field frame may be transmitted during the vertical synchronization period Vsync. A signal for identifying the start and transmission of data transmission, a signal for controlling a transmission speed, a signal for detecting an error in data transmission, and the like may be transmitted through the control field frame. The transmission timing of the control field frame will be described in more detail later with further reference to FIG. 3. FIG. 3 shows the transmission timing of the control field frame according to the V-by-One (Vx1) standard.

The control field frame may be transmitted when the vertical synchronization signal (Vsync signal), the horizontal synchronization signal (Hsync signal), and the data enable signal (DE signal) all have the low logic. Although not shown, in some cases, the control field frame may be transmitted when the vertical synchronization signal (Vsync signal) and the horizontal synchronization signal (Hsync signal) have the low logic and the data enable signal (DE signal) has the high logic.

Meanwhile, an Average Picture Level (APL) of image data may be transmitted through the control field frame. The APL is an average screen level, and when a 10-bit image is described as an example, black becomes 0 and full white becomes 1023, which means an average value of image data of all pixels in one frame.

The APL may be particularly useful in power control of an Organic Light Emitting Diode (OLED) type display that uses an element capable of spontaneous emission without a separate backlight.

Figure 4:
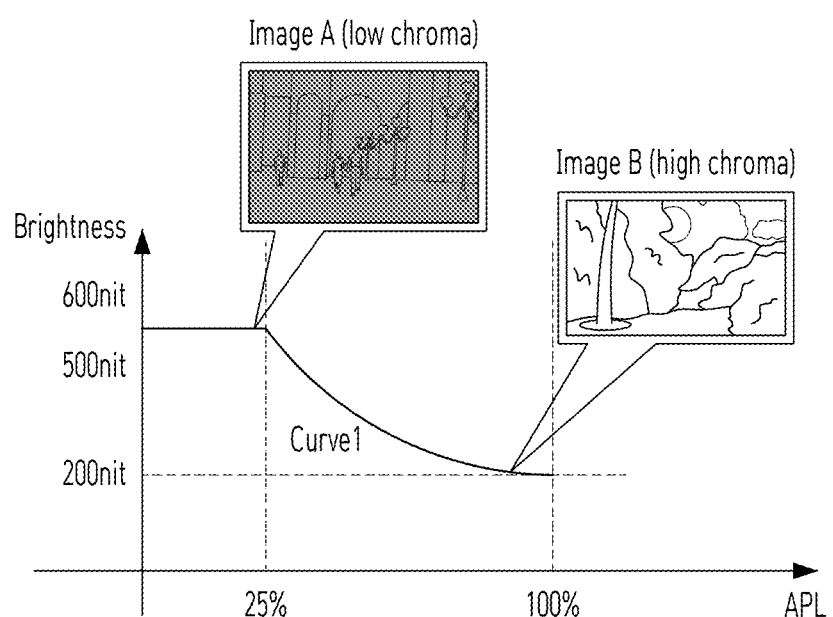
FIG. 4 and FIG. 5 are diagrams illustrating the relationship between APL and display brightness.
Figure 5:
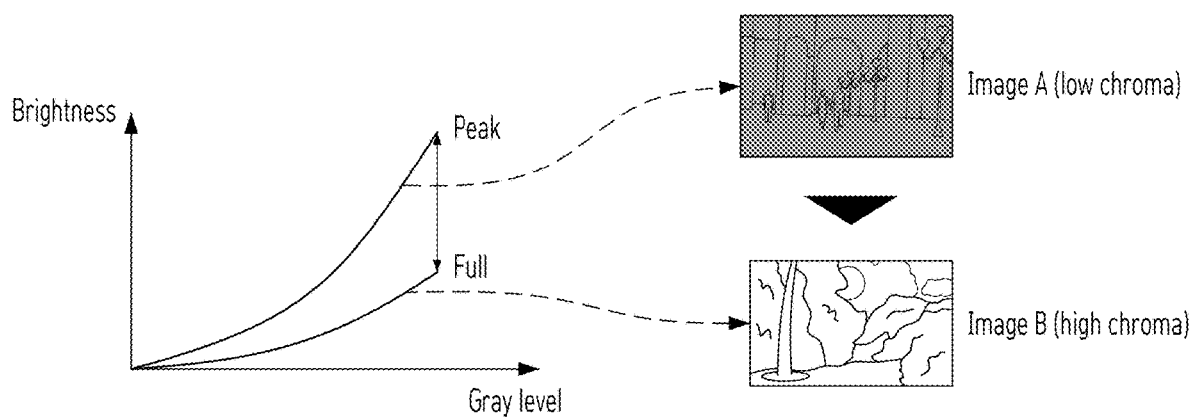

The relationship between the APL and the display brightness will be described with reference to FIG. 4 and FIG. 5. FIG. 4 and FIG. 5 show a relationship between APL and display brightness.

As shown in FIG. 4, images with different APLs may be displayed with different display brightness to increase expressive power or vitality. For example, a first image A having a low APL may be controlled to be displayed with high display brightness. This is to allow a fine bright and dark difference in a dark image to be expressed more sensibly. In addition, a second image B having a high APL may be controlled to be displayed with low display brightness. This is to prevent a bright image from being displayed by being saturated.

Yet, since the first image A with the low APL is being displayed, if the first image A rapidly changes to the second image B with the high APL while the first image A is being outputted by increasing the display brightness, a considerable portion of a display panel may be instantly peak-driven, and in this case, overcurrent occurs to cause power shutdown.

To prevent this, a frame memory (e.g., a volatile memory) for temporarily storing an image received from the image processing device may be separately provided in the display device (not shown), an APL of the image stored in the frame memory may be calculated, and then the image stored in the frame memory may be displayed on the display device according to the calculated APL. However, in this case, since a separate frame memory is required to be provided in the display device, this may increase the manufacturing cost of the display device.

Therefore, if the image processing device 100 can obtain an APL of the image data in advance, when the image data is processed and transmitted to the display device, the APL is transmitted together. Hence, when each frame of the image data is displayed on the display device, it may be able to consider that the corresponding APL of each frame can be immediately reflected in the display brightness. The APL may be received by the image processing device 100 from an image data source (e.g., an RF antenna, a set-top box, an image player, etc.).

Hereinafter, it will be described that APL data is transmitted together through the control field frame when image data is transmitted according to the Vx1 (V-by-One) standard.

The control field frame may include a data start field, an indicator field, a data field, and a data end field. Each of these fields may include 2 bytes (in the case of 4 byte mode) or 3 bytes (in the case of 5 byte mode).

The data start field is used to determine and synchronize a start part of the control field frame.

The indicator field is used to determine the type of data in the data field.

The data field is used to transmit the APL data.

The data end field is used to indicate an end point from the synchronized data start field to the data field.

Mapping of the control field frame will be described.

An FSBS field and an FSBP field may be transmitted in the vertical blanking period Vblank.

The FSBS field is a field indicating the start of a blanking period, and may be located right after an FSACTVE field including pixel data.

The FSBP field is provided for a blanking payload. Vertical synchronization (Vsync) data and horizontal synchronization (Hsync) data may be filled in a byte-0 packet and a byte-1 packet of the FSBP field. The control field frame may be filled in a byte-2 packet and a byte-3 packet of the FSBP field.

The control field frame including the APL data may be mapped in the FSBP field.

Yet, when a transmission error occurs in APL data loaded in a control field frame having the above structure, it is difficult to grasp the transmission error. A control field frame having a structure capable of detecting a transmission error of APL data will be described with further reference to FIG. 6. FIG. 6 illustrates another structure of a control field frame for transmitting APL data.

As shown in FIG. 6, a control field frame may include a preamble field, a length/type field, a data field, a padding field, and an error detection field (e.g., a Frame Check Sequence (FCS) field).

The frame field is 2 bytes (in case of 4-byte mode) or 3 bytes (in case of 5-byte mode), which is used to determine and synchronize a start part of the control field frame.

The length/type field is 2 bytes (in case of 4-byte mode) or 3 bytes (in case of 5-byte mode), which is used to determine a length of the control field frame through a byte-2 packet and to determine the type of data in the data field through a byte-3 packet. As described above, the start and end of the control field frame may be known through the data start field and the data end field in the control field frame, but in the control field frame of FIG. 6, the start and end of the control field frame may be known through the preamble field and the length/type field.

The data field is 2 to 14 bytes (in case of 4-byte mode) or 3 to 21 bytes (in case of 5-byte mode) and may be used to transmit data according to the determined type. That is, the data in the data field may be designated as APL data through the length/type field, and the APL data may be transmitted through the data field.

The padding field may be a dummy byte inputted to facilitate error detection calculation using an error detection code transmitted through the FCS.

The error detection field is 2 bytes (in case of 4-byte mode) or 3 bytes (in case of 5-byte mode), and may be used for an error detection code for detecting a transmission error of data transmitted through the control field frame. A Cyclic Redundancy Check (CRC) code (e.g., CRC16) may be used as the error detection code. Of course, other error detection codes may also be used. When an error is detected, data of a corresponding control field frame may be ignored and/or an alarm may be generated.

It is not possible to transmit only APL data through the control field frame. Since other control data is filled in the data field and a length and a type corresponding to the other control data are designated in the length/type field, the other control data may be transmitted through the control field frame.

Figure 7:
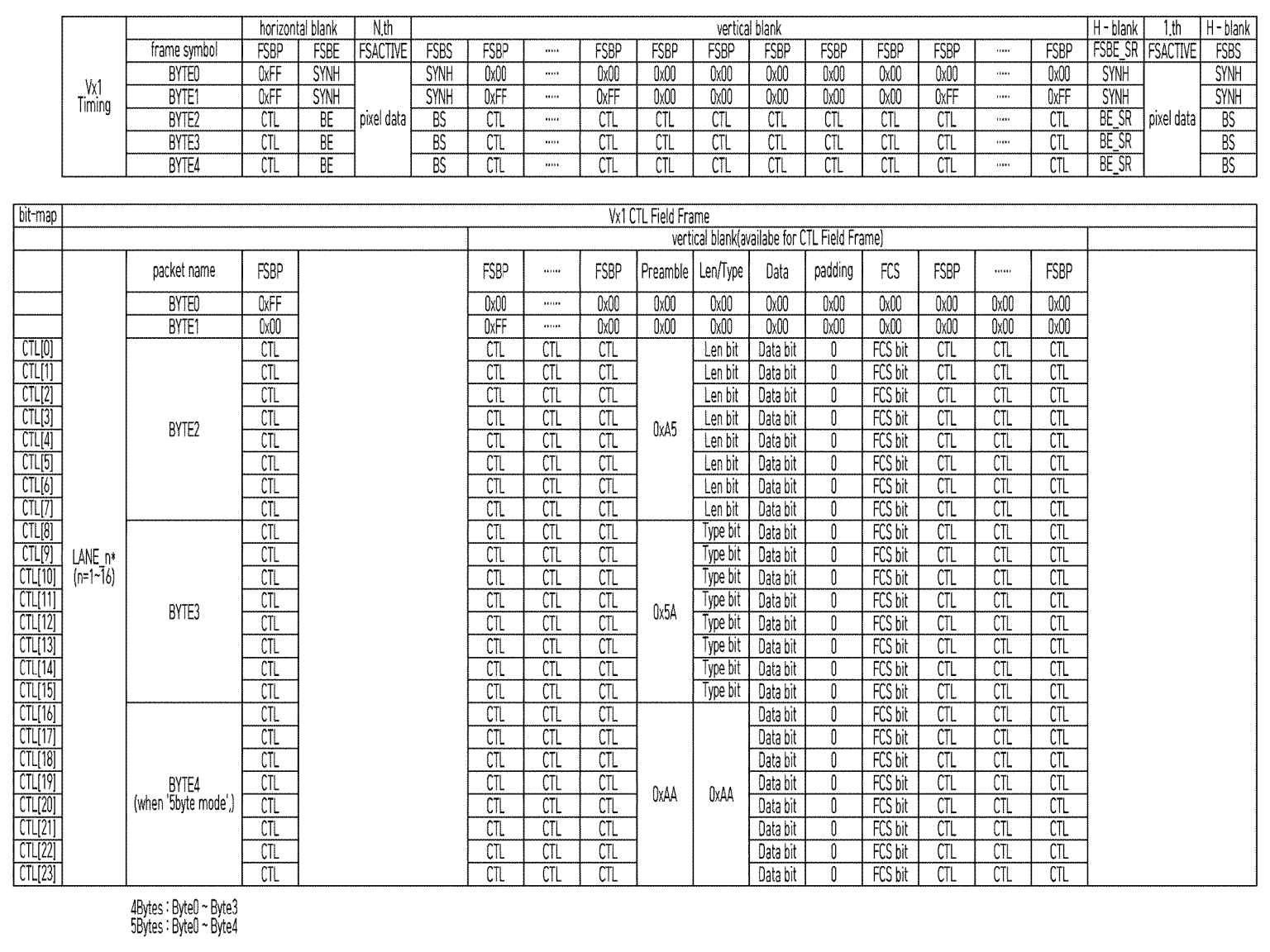

Mapping of the control field frame of FIG. 6 will be described with reference to FIG. 7 and FIG. 8. FIG. 7 and FIG. 8 show examples of the mapping of the control field frame of FIG. 6.

As described above in FIG. 7, an FSBS field and an FSBP field may be transmitted in the vertical blanking period Vblank, and a control field frame including the APL data may be mapped in the FSBP field.

That is, vertical synchronization (Vsync) data and horizontal synchronization (Hsync) data may be filled in a byte-0 packet and a byte-1 packet of the FSBP field.

The control field frame may be filled in a byte-2 packet and a byte-3 packet of the FSBP field.

As shown in FIG. 7 and FIG. 8, the length/type field of the control field frame may be used to determine the length of the control field frame through a byte-2 packet and to determine the type of data in the data field through a byte-3 packet.

In FIG. 7 and FIG. 8, the APL data is illustrated as 10 bits.

Hereinafter, it will be described that the control field frame according to FIGS. 6 to 8 is transmitted from a transmitter to a receiver.

Here, the transmitter and the receiver are merely referred to for convenience according to a transmission relationship of image data and other components of the image processing device may correspond to them depending on circumstances. For example, if the transmitter is the main board 110, the receiver may be the timing controller board 120. Alternatively, if the transmitter is the timing controller board 120, the receiver may be the driver boards 141, 142, 143, and 144.

Figure 9:
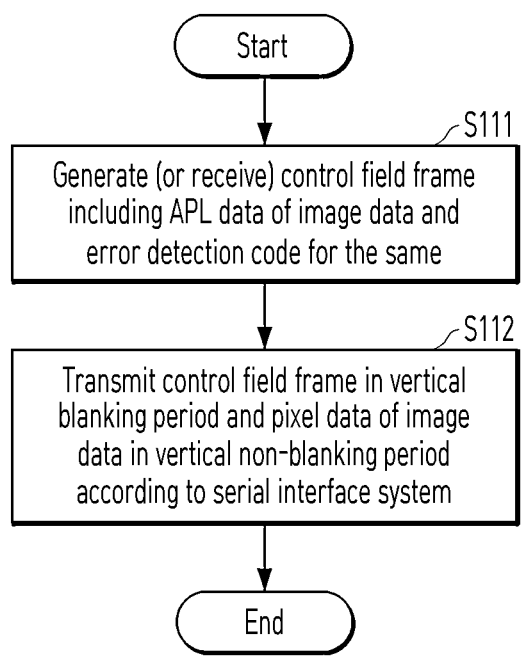
FIG. 9 is a flowchart illustrating transmission of a control field frame according to FIGS. 6 to 8.

First, transmission of the control field frame will be described with reference to FIG. 9. FIG. 9 is a flowchart illustrating transmission of a control field frame according to FIGS. 6 to 8.

The transmitter may generate or receive the control field frame including APL data of the image data and an error detection code for the APL data [S111]. The control field frame is as described in FIGS. 6 to 8.

The transmitter may transmit the control field frame in a vertical blanking period according to a serial interface system, and transmit pixel data of the image data in a vertical non-blanking period [S112]. Of course, the transmitter may transmit data other than the control field frame and the pixel data.

The serial interface system may include a V-by-one (Vx1) interface system.

Figure 10:
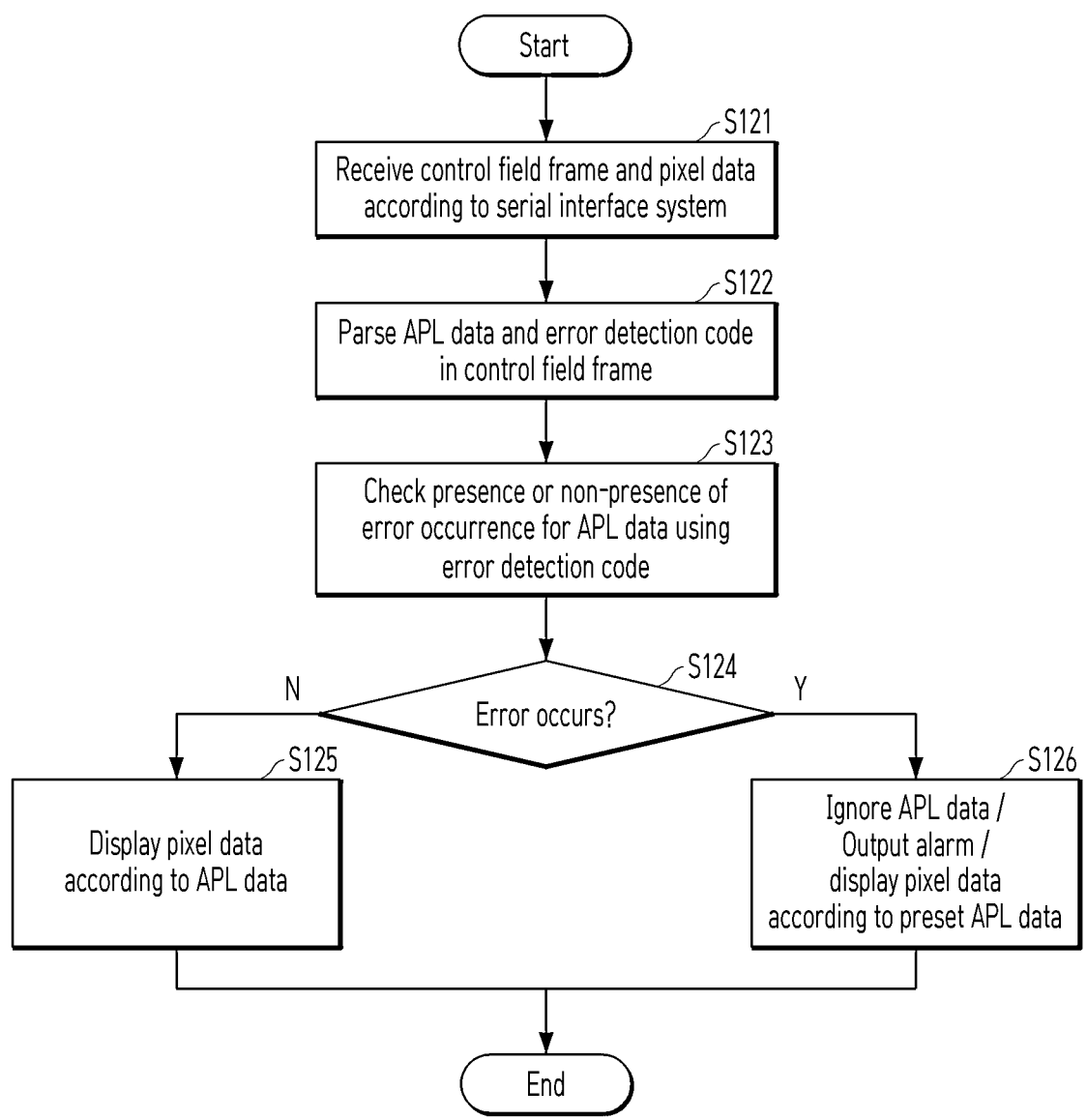
FIG. 10 is a flowchart illustrating reception of a control field frame according to FIGS. 6 to 8.

Hereinafter, reception of the control field frame will be described with reference to FIG. 10. FIG. 10 is a flowchart illustrating reception of a control field frame according to FIGS. 6 to 8.

The receiver may receive the control field frame and pixel data according to the serial interface system [S121]. Of course, the receiver may also receive data other than the control field frame and the pixel data.

The receiver may parse the APL data and the error detection code in the control field frame [S122].

The receiver may determine whether an error has occurred in the APL data using the error detection code [S124].

If it is determined that no error has occurred in the APL data, the receiver may perform an image processing process to display the pixel data according to the APL data [S124, S125].

On the contrary, if it is determined that an error has occurred in the APL data, the receiver may perform an image processing process to ignore the APL data [S124, S126]. In addition, the receiver may perform an image processing process to output an alarm notifying that an error has occurred in the APL data. In addition, the receiver may perform an image processing process to display the pixel data according to preset APL data. The preset APL data may include fixed APL data stored before factory shipment or APL data determined as having no error by being received right before an error occurrence.

It will be appreciated by those skilled in the art to which the present disclosure belongs that the disclosure described above may be practiced in other specific forms without altering its technical ideas or essential features.

For example, an image processing device according to the present disclosure may be implemented in the form of an IC for each component or a combination of two or more components, and the function of the image processing device may be implemented in the form of a program and installed on the IC. When the function of the image processing device according to the present disclosure is implemented as a program, the function of each component included in the image processing device may be implemented as a specific code, and codes for implementing a specific function may be implemented as one program or may be implemented by being divided into a plurality of programs.

It should therefore be understood that the embodiments described above are exemplary and non-limiting in all respects. The scope of the present disclosure is defined by the appended claims, rather than by the detailed description above, and should be construed to cover all modifications or variations derived from the meaning and scope of the appended claims and the equivalents thereof.

What is claimed is:

1. A method of transmitting image data, the method comprising:
   generating a control field frame including Average Picture Level (APL) data of the image data and an error detection code for the APL data;
   transmitting the generated control field frame in a vertical blanking period according to a serial interface system; and
   transmitting pixel data of the image data in a vertical non-blanking period according to the serial interface system,
   wherein the APL data is an average value of image data of all pixels in one frame.

2. The method of claim 1, wherein the control field frame is transmitted in a low logic period of a vertical synchronization signal within the vertical blanking period.

3. The method of claim 2, wherein the control field frame is transmitted in a low logic period of a horizontal synchronization signal within the low logic period of the vertical synchronization signal.

4. The method of claim 3, wherein the control field frame is transmitted within a low logic period of a data enable signal.

5. The method of claim 1, wherein the control field frame comprises a preamble field to determine and synchronize a start part of the control field frame, a data field filled with the APL data, a length/type field to determine a length of the control field frame and a type of data in the data field, a padding field which is a dummy byte inputted to facilitate error detection calculation, and an error detection field filled with the error detection code.

6. The method of claim 5, wherein the error detection code comprises a Cyclic Redundancy Check (CRC) code.

7. The method of claim 1, wherein the serial interface system follows a V-by-One (Vx1) standard.

8. A method of receiving image data, the method comprising:
   receiving a control field frame for the image data and pixel data of the image data according to a serial interface system;
   parsing Average Picture Level (APL) data of the image data and an error detection code for the APL data in the control field frame, wherein the APL data is an average value of image data of all pixels in one frame;
   determining whether an error occurs in the APL Data using the error detection code;
   displaying the pixel data according to the APL data when the error has not occurred in the APL data; and
   outputting an alarm notifying the error when the error occurs in the APL data.

9. The method of claim 8, further comprising displaying the pixel data according to a preset APL data when the error occurs in the APL data.

10. The method of claim 8, wherein the control field frame is transmitted in a low logic period of a vertical synchronization signal within a vertical blanking period.

11. The method of claim 10, wherein the control field frame is transmitted in a low logic period of a horizontal synchronization signal within the low logic period of the vertical synchronization signal.

12. The method of claim 11, wherein the control field frame is transmitted within a low logic period of a data enable signal.

13. The method of claim 8, wherein the control field frame comprises a preamble field to determine and synchronize a start part of the control field frame, a data field filled with the APL data, a length/type field to determine a length of the control field frame and a type of data in the data field, a padding field which is a dummy byte inputted to facilitate error detection calculation, and an error detection field filled with the error detection code.

14. The method of claim 13, wherein the error detection code comprises a Cyclic Redundancy Check (CRC) code.

15. The method of claim 8, wherein the serial interface system follows a V-by-One (Vx1) standard.

16. An image processing device, comprising:
   a transmitter configured to generate a control field frame including Average Picture Level (APL) data of image data and an error detection code for the APL data, transmit the generated control field frame in a vertical blanking period according to a serial interface system, and transmit pixel data of the image data in a vertical non-blanking period according to the serial interface system; and
   a receiver configured to receive the control field frame and the pixel data according to the serial interface system, parse the APL data and the error detection code, determine whether an error occurs in the APL data using the error detection code, display the pixel data according to the APL data based on determining that the error fails to occur, and output an alarm notifying the error when the error occurs in the APL data, wherein the APL data is an average value of image data of all pixels in one frame.

17. The image processing device of claim 16, wherein the control field frame is transmitted in a low logic period of a vertical synchronization signal within the vertical blanking period.

18. The image processing device of claim 17, wherein the control field frame is transmitted in a low logic period of a horizontal synchronization signal within the low logic period of the vertical synchronization signal.

19. The image processing device of claim 18, wherein the control field frame is transmitted within a low logic period of a data enable signal.

20. The image processing device of claim 16, wherein the control field frame comprises a preamble field to determine and synchronize a start part of the control field frame, a data field filled with the APL data, a length/type field to determine a length of the control field frame and a type of data in the data field, a padding field which is a dummy byte inputted to facilitate error detection calculation, and an error detection field filled with the error detection code.

* * * * *